US006753900B2

(12) United States Patent
Runcie et al.

(10) Patent No.: US 6,753,900 B2
(45) Date of Patent: Jun. 22, 2004

(54) METHOD AND APPARATUS FOR OVERCOMING THE LIMITATIONS OF CAMERA ANGLE IN VIDEO CONFERENCING APPLICATIONS

(75) Inventors: Peter D. Runcie, Bilgola Plateau (AU); Stuphane Laveau, Gleve (AU)

(73) Assignee: Avaya Techology Corp., Basking Ridge, NJ (US)

(*) Notice: Subject to any disclaimer, the term of this patent is extended or adjusted under 35 U.S.C. 154(b) by 0 days.

(21) Appl. No.: 10/141,336

(22) Filed: May 7, 2002

(65) Prior Publication Data

US 2003/0210326 A1 Nov. 13, 2003

(51) Int. Cl.[7] .................................................. H04N 7/14
(52) U.S. Cl. ............................. 348/14.16; 348/14.08; 348/14.03
(58) Field of Search ......................... 348/14.01–14.09, 348/14.1, 14.11–14.14, 14.16; 382/154

(56) References Cited

U.S. PATENT DOCUMENTS

| | | | |
|---|---|---|---|
| 5,675,376 A | 10/1997 | Andersson et al. | ............ 348/20 |
| 5,986,703 A | 11/1999 | O'Mahony | .................. 348/333 |
| 6,507,356 B1 | 1/2003 | Jackel et al. | ............. 348/14.06 |
| 2002/0061131 A1 * | 5/2002 | Sawhney et al. | ............ 382/154 |

FOREIGN PATENT DOCUMENTS

| | | | | |
|---|---|---|---|---|
| JP | 401221086 A | * | 9/1989 | ............ H04N/7/14 |
| JP | 404344788 A | * | 12/1992 | ............ H04N/7/14 |

OTHER PUBLICATIONS

Fintzel et al., "Real Time 3D Navigation in a Static Virtualzied Scene from a Limited Set of 2D Data," 11 pages, IEEE Int'l Conf. on Multimedia & Expo 2000, New York, Electronic Proceedings, 2000.

Mark et al., "Post–Rendering 3D Warping", *In Proceedings of 1997 Symposium on Interactive3D Graphics*, Providence, RI, Apr. 27–30, 1997, pp. 7–16.

http://www–cs.ccny.cuny.edu/~wolberg/diw.html, Mar. 4, 2002, 7 pages, Preface and Table of Contents for Wolberg, Digital Image Warping, IEEE Computer Society Press Monograph.

* cited by examiner

Primary Examiner—Melur Ramakrishnaiah
(74) Attorney, Agent, or Firm—Sheridan Ross P.C.

(57) ABSTRACT

The present invention is directed to overcoming the limitations of available camera angles in video conferencing applications. In particular, the present invention allows a video conference participant to select a virtual viewpoint of that participant, for providing an image to other participants. In a further embodiment, the present invention allows a video conference participant to select a virtual viewpoint of another video conference participant. The present invention provides an input device for receiving selected viewpoint information from a video conference participant. In response to a selected virtual viewpoint, the present invention transforms an image taken of a participant from an actual camera viewpoint. In accordance with a further embodiment of the present invention, multiple cameras may be utilized to obtain reference information.

25 Claims, 3 Drawing Sheets

METHOD AND APPARATUS FOR OVERCOMING THE LIMITATIONS OF CAMERA ANGLE IN VIDEO CONFERENCING APPLICATIONS

FIELD OF THE INVENTION

The present invention relates to an image acquisition system capable of providing a selected virtual camera angle in connection with a video conferencing application. In particular, the present invention allows the selection of a virtual viewpoint in connection with a scene imaged from an actual viewpoint that does not coincide with the selected virtual viewpoint in a video conferencing application.

BACKGROUND OF THE INVENTION

The use of video conferencing, which allows remote parties to both see and hear one another, is becoming increasingly popular. In particular, such applications facilitate remote communication by providing a visual image of each conference participant. Accordingly, video conferencing allows parties to communicate audibly and visibly, without requiring lengthy and expensive travel.

In a typical video conferencing application, a camera is positioned to obtain an image of each of the video conference participants. The image of one participant is then provided to the other participant. Because the individual participants in a video conference are typically looking at a video monitor providing an image of the other participant, it is impossible to position a camera such that a participant is looking directly into the camera. The angle between the camera viewpoint and the gaze of a participant is particularly large in personal, PC based video conferencing systems and video telephones, where the camera is close to the participant's face. Because the participants in a normal, face to face conversation, generally look each other in the eye, the angled viewpoint that is typically provided in a video conferencing scenario can be disconcerting.

For the reasons set forth above, there is a need for a method and apparatus capable of overcoming the limitations of camera angle in video conferencing applications. In particular, there is a need for a method and apparatus to permit a virtual viewpoint to be selected, such that a more natural view of a video conference participant could be provided to other participants.

SUMMARY OF THE INVENTION

The present invention is directed to solving these and other problems and disadvantages of the prior art. According to the present invention, input is received from a video conference participant regarding a desired camera angle or viewpoint. Image information received by a camera or cameras having an actual angle or viewpoint is received, and that information is processed to create an image of the scene from the viewpoint selected by the user. Accordingly, the present invention provides an image of a scene when viewed from a virtual viewpoint.

In accordance with an embodiment of the present invention, more than one camera is used to obtain image information regarding a scene. The use of multiple cameras allows a scene to be imaged from multiple actual viewpoints. This in turn provides more image information, facilitating the realistic imaging of the scene from a virtual viewpoint.

In accordance with an embodiment of the present invention, a first video conference participant may select a virtual viewpoint of him or herself in real time or near real time. In particular, by altering the virtual viewpoint while viewing the created image of the scene including the first participant in real time, a more natural viewing angle can be selected. For example, the first video conference participant typically selects a virtual viewpoint that results in the participant's eyes looking directly out of the display used to output the image. In accordance with another embodiment of the present invention, a first video conference participant may select a virtual viewpoint with respect to a scene that comprises an image of a second video conference participant. In accordance with yet another embodiment of the present invention, a video conference participant may select a virtual viewpoint from a predefined set of virtual viewpoints.

A video conferencing image acquisition system in accordance with an embodiment of the present invention generally includes at least one camera to obtain an image of a scene that includes one or more video conference participants at a first location. In addition, the system includes a processor capable of receiving information regarding a selected virtual viewpoint from an input device, and capable of transforming the image of the scene obtained by the camera or cameras to create an image representing the scene from the selected virtual viewpoint. A video conferencing image acquisition system in accordance with the present invention may additionally include a display at the first location for outputting an image taken by the camera or cameras at the first location to provide feedback in connection with the selection of a virtual viewpoint. Alternatively or in addition, a display at the first location may provide images from an actual or virtual viewpoint obtained from a camera or cameras located at a second video conference location. These different views may be displayed simultaneously in separate windows or in a picture in a picture type arrangement on a single display at the first location. These different views may also be displayed simultaneously on different displays at the first location.

These and other advantages and features of the invention will become more apparent from the following description of illustrative embodiments of the invention, taken together with the drawings.

DETAILED DESCRIPTION

In accordance with the present invention, a video conferencing image acquisition system that allows a user to select a virtual view angle is provided.

Figure 1:
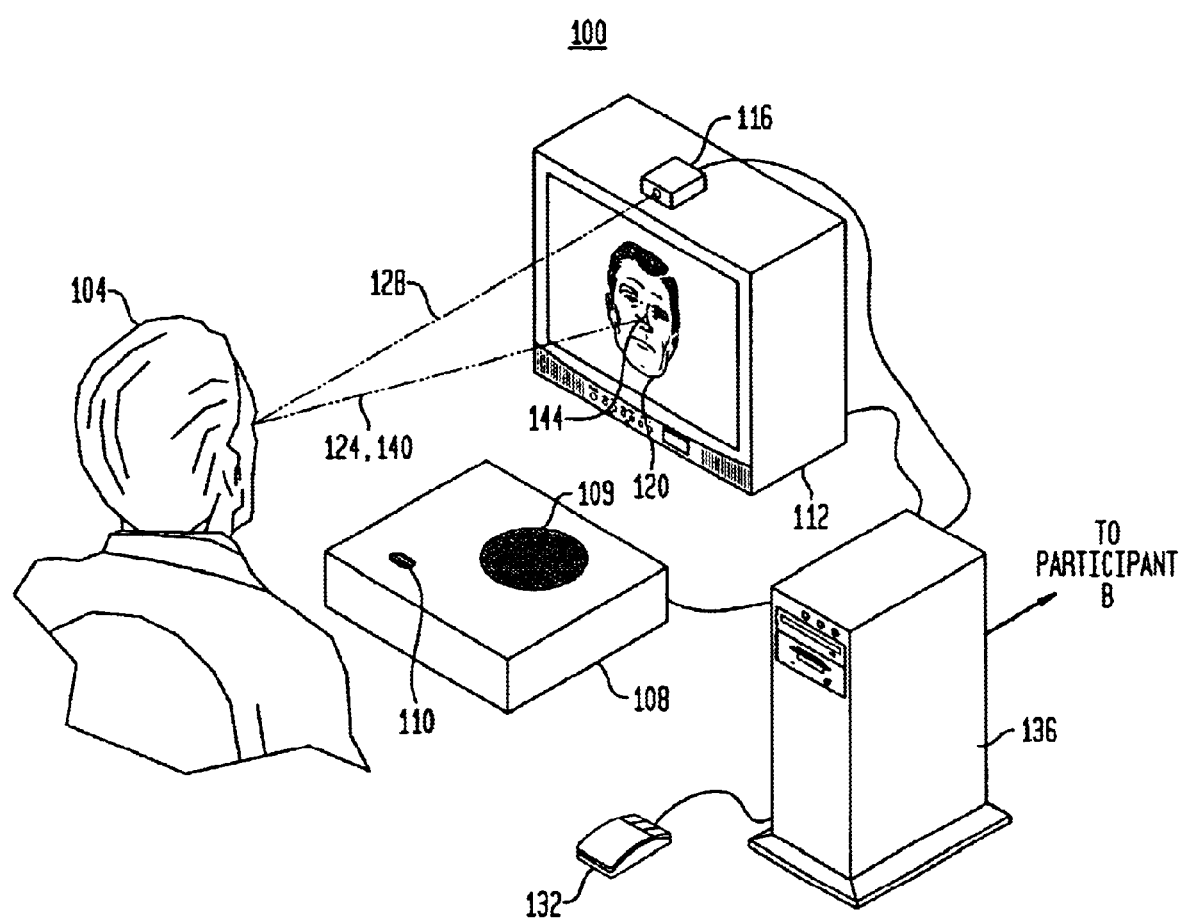
FIG. 1 depicts components of a video conferencing image acquisition system in accordance with an embodiment of the present invention.

With reference to FIG. 1, components of a video conferencing image acquisition system 100 in accordance with an embodiment of the present invention are illustrated. In general, the video conferencing image acquisition system 100 comprises a first video conference participant 104, an audio transceiver 108, which includes a speaker 109 and a microphone 110, a video display 112, and a camera 116. The video conferencing image acquisition system 100 allows the first video conference participant 104 to communicate both audibly and visibly with a second video conference participant at a remote location. In FIG. 1, an image of the second video conference participant 120 is shown in the display 112.

As depicted in FIG. 1, the first video conference participant 104 typically directs his or her gaze at the image of the second video conference participant 120 in the display 112. Accordingly, the eyes of the first video conference participant 104 are directed along a line of sight 124 that generally runs between the first video conference participant 104 and the display 112. However, the camera 116 used to obtain an image of the first video conference participant 104 is located such that the viewpoint 128 of the camera is not aligned with the first video conference participant's 104 line of sight 124.

In general, the video conferencing image acquisition system 100 of the present invention provides a user selection input device 132 associated with a processor 136 for creating a virtual camera 116 viewpoint. For example, as will be explained in greater detail below, the first video conference participant 104 can select a virtual viewpoint 140 for the camera 116 that coincides with or is close to the line of sight 124 of the first video conference participant 104, such that a more natural view of the first video conference participant 104 is provided to a second video conference participant 120. The selected virtual viewpoint may be indicated to the first video conference participant by a cursor 144 that can be moved using the user selection input device 132. In accordance with an embodiment of the present invention, the selection of a virtual viewpoint can be facilitated by substituting the image 120 of the second video conference participant 120 with an image of the first video conference participant 104 taken from the selected virtual viewpoint.

Figure 2:
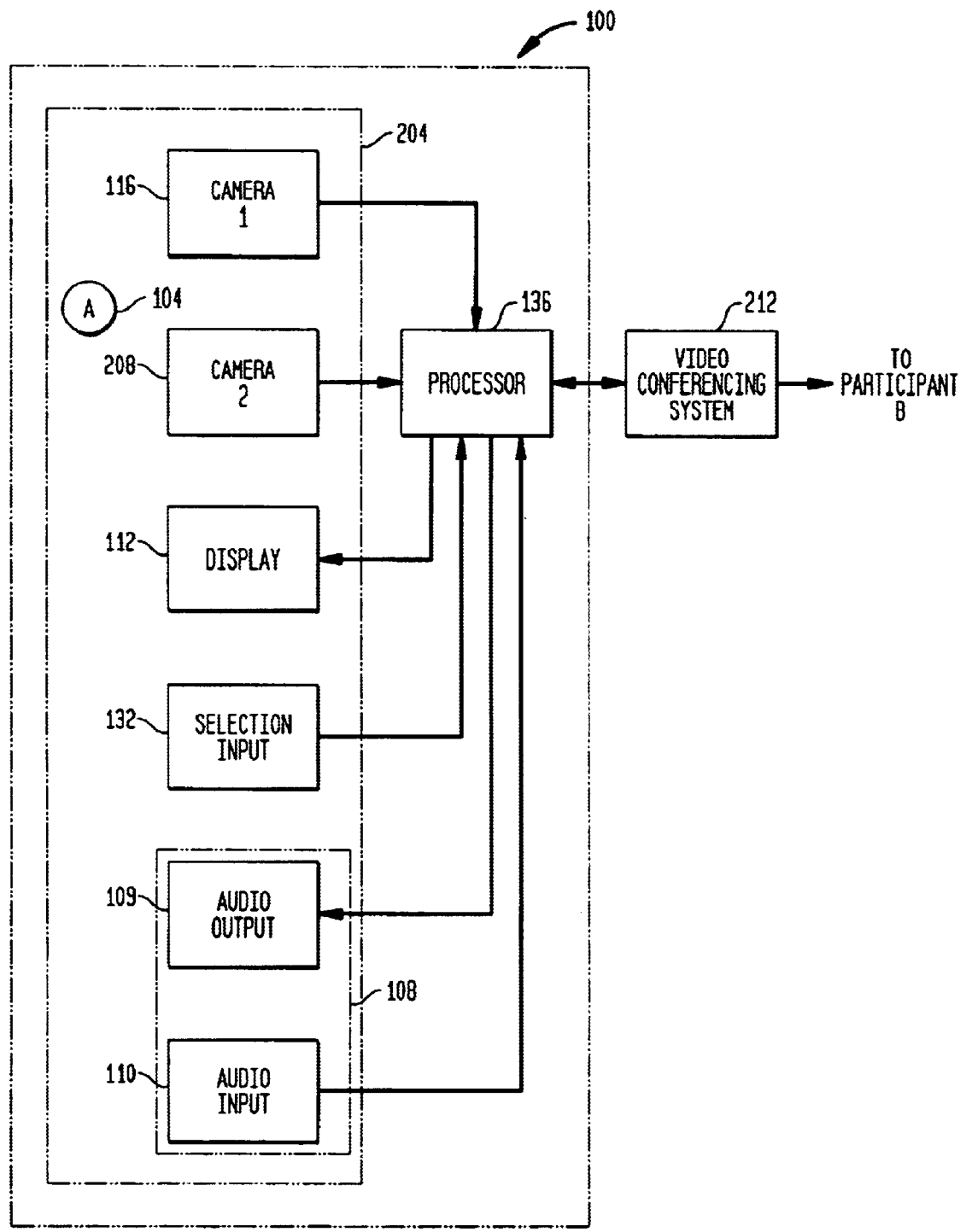
FIG. 2 is a block diagram depicting a video conferencing image acquisition system in accordance with an embodiment of the present invention.

With reference now to FIG. 2, a video conferencing image acquisition system 100 in accordance with an embodiment of the present invention is depicted in block diagram form. As noted above, the video conferencing image acquisition system 100 generally functions in connection with at least first and second video conference participants. As shown in FIG. 2, a video conferencing image acquisition system 100 in accordance with the present invention generally includes an audio transceiver 108, and the included speaker 109 and microphone 110, a display 112, a camera 116, a user selection input device 132, and a processor or controller 136. In general, the devices for interfacing with the first video conference participant 104, such as the audio transceiver 108, the display 112, the camera 116, and the user selection input 120 are located in the proximity of the first video conference participant (i.e. at a first video conference location 204). In addition, the first video conference location 204 may include additional cameras, such as a second camera 208. The first video conference location 204 may additionally include the processor or controller 136. Alternatively, the processor or controller 136 may be sited at a different location. Furthermore, functions of the processor or controller 136 may be distributed among various locations interconnected to the video conferencing image acquisition system 100.

The audio transceiver 108 provides audio output through a speaker 109 and audio input through a microphone 110. In accordance with an embodiment of the present invention, the audio transceiver 108 comprises a speaker phone having common telephony functionality. According to another embodiment of the present invention, the audio transceiver 108 comprises a speaker 109 and a microphone 110 that function as part of a soft phone running on a processor 136 comprising a general purpose or personal computer. In general, the audio transceiver 108 may be any device capable of translating acoustical signals into electrical signals and vice versa.

The display 112 may comprise any device capable of receiving a video signal and displaying a corresponding image. Accordingly, the display 112 may comprise a cathode ray tube, or a liquid crystal display.

The camera 116, and if supplied the second camera 208, may be any device capable of translating images of a scene into electronic signals. For example, the camera 116, 208 may comprise an optical lens system in combination with an image sensor, such as a charge coupled device.

The user selection input device 132 may comprise various devices for receiving input from a user, such as a first video conferencing participant 104. For example, the user selection input device 132 may comprise a keyboard; a pointing device, such as a mouse or track ball; or a voice recognition system operating in connection with the microphone 110. Signals from the user selection input device 132 are provided to the processor 136.

The processor 136 may, as mentioned above, comprise a general purpose or personal computer. In addition, the processor 136 may comprise a specially adapted video conferencing processor unit, for example, utilizing a specialized controller, or a general purpose processor running code specifically adapted for performing video conferencing functions. For example, the processor 136 may comprise a personal computer running a video conferencing software application in conjunction with a standard operating system, such as the Windows® operating system. As a further example, the processor 136 may comprise a video telephone incorporating a suitably programmed controller running firmware.

In connection with the present invention, the processor 136 runs a video conferencing application that incorporates the ability to transform an image of a scene taken from a first viewpoint, and to manipulate that image to create an image of the scene taken from a virtual viewpoint. In particular, the image taken by a camera 116, 208 may be altered such that the scene is viewed from a virtual viewpoint that corresponds to or approximates the line of sight 124 of a video conference participant 104 (see FIG. 1).

After transforming the image obtained by the camera 116 or cameras 116, 208, the video conferencing image acquisition system 100 may provide the transformed image to a video conferencing system 212. The video conferencing system 212 may comprise a communication network interconnecting the video conferencing image acquisition system 100 to a second video conferencing image acquisition system, or to any video conferencing station or device capable of displaying images for viewing by a second video conference participant. In addition, the video conferencing system 212 may comprise protocols for the transfer of audio and video information between the video conferencing image acquisition system 100 used by the first video conference participant 104, and the input and output system used by the second video conference participant 120. In accordance with an embodiment of the present invention, the second video conference participant 120 may view the images provided by the video conferencing image acquisition system 100 of the present invention on a conventional video phone, or a soft video phone implemented in connection with a personal computer. In accordance with a further embodiment of the present invention, the video conferencing system 212 comprises the Internet, and utilizes Internet protocol type communications, such as the H.323 or Session Initiation Protocol (SIP) protocols.

The transformation of an image viewed from an actual viewpoint to an image viewed from a virtual viewpoint may be accomplished using a variety of known algorithms. For example, image warping techniques capable of modeling an imaged scene in either two or three dimensions may be utilized. According to such techniques, derived or virtual image frames are computed from reference frames comprising images taken from the actual viewpoint of the camera 116 or cameras 116, 208 (e.g., viewpoint 128 in FIG. 1). In accordance with an embodiment of the present invention, a two-dimensional or three-dimensional mathematical model of an imaged object is developed. As part of the acquisition of the model, the position of objects in the image are characterized as part of a calibration process. The information thus developed may be utilized by the transformation algorithm to provide real time or near real time transformation of an image into an image taken from a virtual viewpoint using re-rendering or image warping techniques. In particular, spacial or linear transformations are utilized to define new locations for pixels, corresponding to the selected virtual viewpoint (e.g., viewpoint 140 in FIG. 1). In accordance with an embodiment of the present invention, coordinate transformation techniques are utilized to determine the location of pixels in transformed images. Interpolation techniques may be utilized to derive color and luminance information with respect to pixels in the derived image. In general, any algorithm or technique that allows an image to be transformed into a derived image in which the viewpoint of an object in the image has been altered may be utilized.

Figure 3:
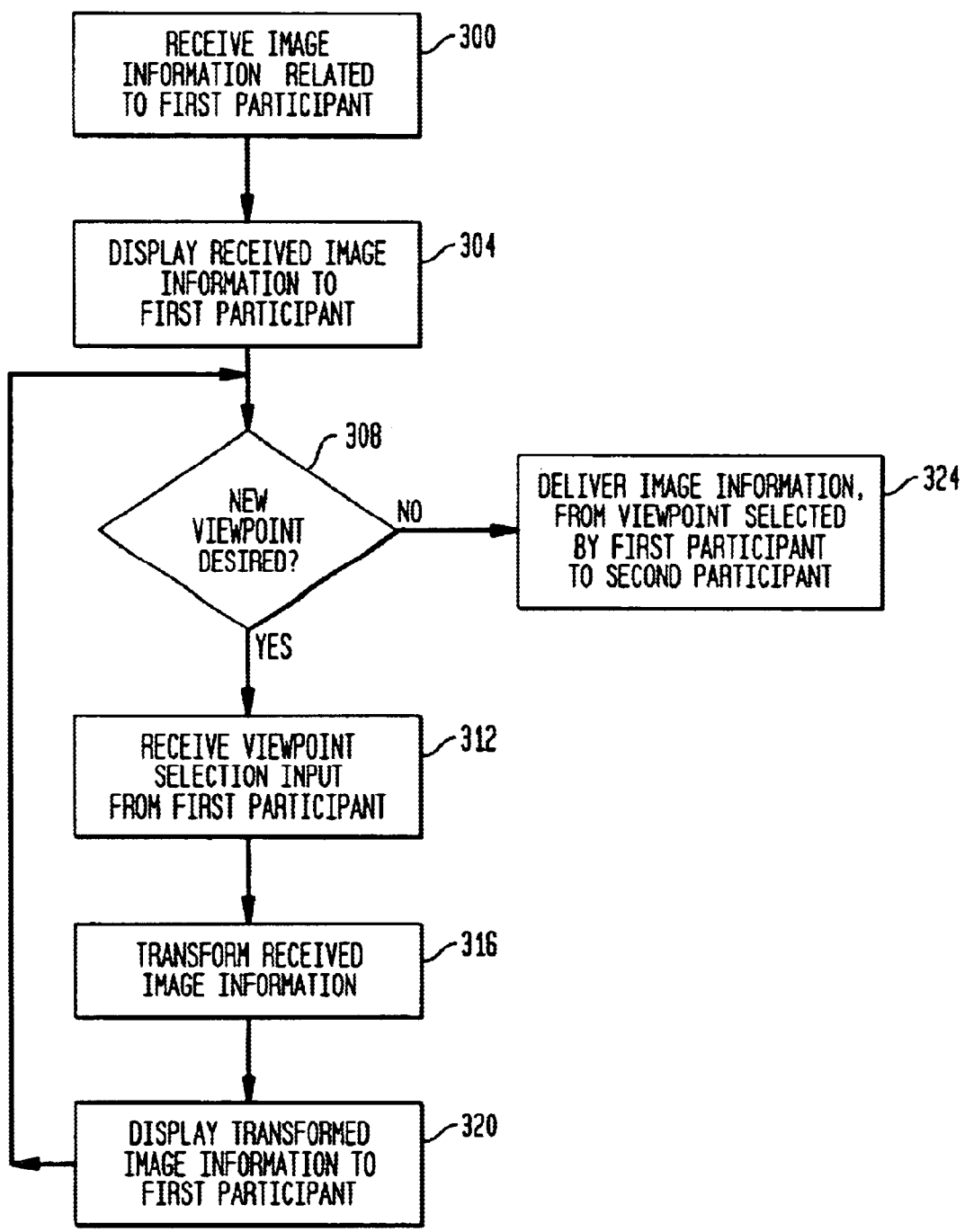
FIG. 3 is a flow diagram depicting the operation of a video conferencing image acquisition system in accordance with an embodiment of the present invention.

With reference now to FIG. 3, a flow chart of the operation of a video conferencing image acquisition system 100 in accordance with an embodiment of the present invention is illustrated. Initially, at step 300, image information related to a first video conference participant 104 is received from the camera 116 or cameras 116, 208. The image information obtained from the camera 116 is displayed to the first video conference participant 104 by the display 112 (step 304). In embodiments of the present invention utilizing a plurality of cameras 116, 208, the image displayed by the display 112 may be the image obtained by one of the cameras 116 or 208.

At step 308, a determination is made as to whether the first video conference participant 104 desires an altered or transformed viewpoint. If an altered or transformed viewpoint is desired, the first participant's viewpoint selection input is received (step 312). In particular, the first video conference participant 104 may indicate a desire to alter the viewpoint of the image taken of that participant by making appropriate selections using the user selection input device 132. For example, according to an embodiment of the present invention, the first video conference participant 104 may utilize a user selection input device 132 comprising a pointing device, such as a mouse, to manipulate a cursor 144 on the display 112. In accordance with an embodiment of the present invention, the position of the cursor 144 on the display 112 corresponds to the selected virtual viewpoint. By manipulating the cursor 144 on the display 112, the first video conference participant 104 may select a altered virtual viewpoint 140 that differs from the actual viewpoint 128 of the camera 116. In a typical application, the first video conference participant 104 will select a virtual viewpoint 140 that is more closely aligned with the line of sight 124 of the first video conference participant, than is the viewpoint 128 of the camera 116.

As an additional or an alternative method for selecting a virtual viewpoint 140, a predetermined virtual viewpoint 140 may be selected by the video conference participant. For example, the video conferencing image acquisition system 100 may allow a user to choose from a number of preset virtual viewpoints 140. The preset virtual viewpoints may be provided to create a transformed image of the first video conference participant 104 that appears to have been taken along a line that approximates the line of sight 124 of the participant 104, when the camera 116 is at various preselected angles with respect to the first video conference participant 104. Predetermined virtual viewpoints may also be provided that allow the first video conference participant 104 to approximate or achieve an image of the second video conference participant 120 that appears to have been taken along the line of sight of the second video conference participant 120.

Utilizing the received viewpoint selection input from the first video conference participant 104, the video conferencing image acquisition system 100 transforms the received image (i.e. the image received from the camera 116, and, if provided, camera 208) (step 316). In particular, the processor 136, running suitable algorithms, generates a view of the first video conference participant 104 taken from the selected virtual viewpoint 140.

After transforming the received image information, the system displays that transformed image information to the first video conference participant 104 (step 320). The system then returns to step 308 to determine whether a different viewpoint has been selected by the first video conference participant 104. In general, after the first video conference participant 104 has found an acceptable virtual viewpoint 140, the transformed image information, having the viewpoint selected by the first video conference participant 104, is delivered to the second video conference participant 120 (step 324).

It should be appreciated that a video conferencing image acquisition system 100 in accordance with the present invention is not limited to use in connection with personal video conferencing equipment, such as video telephones and video soft phones associated with general purpose computers. For example, the present invention may be utilized in connection with room-based video conferencing systems. Furthermore, it should be appreciated that a selected virtual viewpoint 140 may be altered while a video conference is in progress. For example, a video conference participant may choose to alter the viewpoint presented of that participant during a video conference. Feedback, in the form of a representation of the image provided to the second video conference participant 120, may be provided in, for example, a window or subwindow on the display 112. As a further example, it should be appreciated that a video conference participant may select a virtual viewpoint of the other video conference participant while a video conference is in progress. For instance, a second video conference participant 120 may update the selected virtual viewpoint of the first video conference participant 104 to pan the provided image, for example as the first video conference participant 104 moves about the first video conference location 204. Accordingly, it should also be appreciated that a video conference participant may select altered viewpoints of images taken of other video conference participants, as an alternative or in addition to selecting a viewpoint from which the first video conference participant is shown to other participants.

Furthermore, it should be appreciated that, once a virtual viewpoint 140 has been selected, an image of a video conference participant taken from the selected viewpoint is updated with each reference frame obtained by the camera 116 or cameras 116, 208. Accordingly, full motion or near full motion video information, that is transformed in real time or near real time such that the apparent viewpoint of a participant is a selected virtual viewpoint 140, is provided.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A method for providing a virtual viewpoint of a video conference scene, comprising:

displaying a location of a virtual viewpoint to a first video conference participant;

receiving information specifying a first selected virtual viewpoint, wherein said first selected virtual viewpoint is at a first location;

receiving image information obtained of said video conference scene from at least a first viewpoint; and processing said received image information to create a view of said scene from said first selected virtual viewpoint.

2. The method of claim 1, further comprising receiving image information obtained of said video conference scene from a second viewpoint, wherein said step of processing comprises processing said image information from said first viewpoint and from said second viewpoint to create a view of said scene from said first selected virtual viewpoint.

3. The method of claim 1, wherein said step of processing said received image information comprises creating a two-dimensional model of said image from said image information.

4. The method of claim 1, wherein said step of processing said received image information comprises creating a three-dimensional model of said image from said image information.

5. The method of claim 1, further comprising:

displaying said view of said scene from said first selected virtual viewpoint.

6. The method of claim 5, wherein said received image information comprises an image of a first video conference participant, and wherein said step of displaying comprises displaying said view of said scene from said first selected virtual viewpoint to said first video conference participant.

7. The method of claim 6, wherein said received first selected virtual viewpoint information is received from said first video conference participant.

8. The method of claim 6, wherein said step of displaying further comprises displaying said view of said scene from said first selected virtual viewpoint to a second video conference participant.

9. The method of claim 5, further comprising:

receiving information specifying a second selected virtual viewpoint, wherein said second selected virtual viewpoint is at a second location;

processing said received image information to create a view of said scene from said second selected virtual viewpoint; and displaying said view of said scene from said second selected virtual viewpoint.

10. The method of claim 9, wherein said information specifying said first and second selected virtual viewpoint is received from a first video conference participant, and wherein said scene comprises an image of said first video conference participant.

11. The method of claim 9, wherein said step of displaying said scene from said second selected virtual viewpoint is performed in near real time after said first selected virtual viewpoint information is received.

12. The method of claim 1, further comprising:

receiving a command to alter a position of said virtual viewpoint;

displaying said virtual viewpoint to said first video conference participant, wherein said virtual viewpoint is at a second position, wherein said step of receiving information specifying a first selected virtual viewpoint includes receiving a command from said first video conference participant selecting said second position as said first selected virtual viewpoint.

13. The method of claim 1, wherein said step of displaying a virtual viewpoint to a first video conference participant comprises displaying a cursor at a position on a video display corresponding to said virtual viewpoint.

14. A method for providing a virtual viewpoint of a first video conference participant, comprising:

obtaining first image information of the first video conference participant from at least a first physical viewpoint using at least a first camera; displaying a location of a virtual viewpoint to said first video conference participant;

receiving a command selecting to a first virtual viewpoint;

processing said first image information of the first video conference participant to create a first virtual image, wherein said first virtual image represents the first video conference participant from said first virtual viewpoint, wherein said first virtual viewpoint is different from said first physical viewpoint;

providing said first virtual image to a video conferencing system; and displaying said first virtual image to a second video conference participant.

15. The method of claim 14, further comprising:

displaying said first virtual image to the first video conference participant;

receiving location information related to a second virtual viewpoint, wherein said first and second virtual viewpoints are displayed to said first video conference participant as a cursor, and wherein said location information related to a second virtual viewpoint includes receiving a command to change a location of said cursor from a location of said first virtual viewpoint to a location of said second virtual viewpoint and receiving a command selecting said second virtual viewpoint;

processing said image of the first video conference participant to create a second virtual image, wherein said second virtual image represents the first video conference participant from said second virtual viewpoint, wherein said second virtual viewpoint is different from said first virtual viewpoint; and displaying said second virtual image to the second video conference participant; participant.

16. The method of claim 15, further comprising:

displaying a transition from said first virtual image to said second virtual image in near real time, wherein said near real time is a time period that is about equal to a time required for said information related to said second virtual viewpoint to be received.

17. The method of claim 15, wherein said step of displaying further comprises displaying said first and second images to the first video conference participant.

18. The method of claim 17, wherein said location first and second virtual viewpoints are selected by the first video conference participant.

19. The method of claim 14, comprising:

obtaining second image information of the first video conference participant from at least a second physical viewpoint using at least a second camera, wherein said step of processing further comprises processing said first and second image information of the first video conference participant to create said first virtual image.

20. A video conferencing system, comprising:

a first camera having a first viewpoint with respect to an imaged object, wherein first image information is obtained;

a first input device, wherein a desired location of a virtual viewpoint of said imaged object can be input;

a processor;

image processing software operable on said processor, wherein a desired virtual image of said imaged object is created from said first image information, wherein a location of a viewpoint of said virtual image is said input location; and a first output device, wherein said location of a virtual viewpoint of said imaged object is output to a user of the system as a cursor.

21. The system of claim 20, further comprising:

a second camera having a second viewpoint with respect to said imaged object, wherein second information is obtained, wherein a desired virtual image of said imaged object is created from said first and second image information.

22. The system of claim 20, further comprising a second output device, wherein said first output device is situated at a first location and said second output device is situated at a second location.

23. The system of claim 22, wherein said first output device is in view of said imaged object.

24. The system of claim 23, wherein said first input device is operated in connection with feedback from said first output device.

25. The system of claim 22, further comprising a video data transmission network for providing said desired viewpoint of said imaged object to said second output.

* * * * *